United States Patent
Wu

(10) Patent No.: US 9,432,823 B2
(45) Date of Patent: Aug. 30, 2016

(54) METHOD AND SYSTEM FOR SENDING SHORT MESSAGE

(75) Inventor: Hao Wu, Shenzhen (CN)

(73) Assignee: ZTE CORPORATION, Shenzhen, Guangdong Province (CN)

(*) Notice: Subject to any disclaimer, the term of this patent is extended or adjusted under 35 U.S.C. 154(b) by 116 days.

(21) Appl. No.: 14/376,119

(22) PCT Filed: Apr. 24, 2012

(86) PCT No.: PCT/CN2012/074625
§ 371 (c)(1),
(2), (4) Date: Jul. 31, 2014

(87) PCT Pub. No.: WO2013/113195
PCT Pub. Date: Aug. 8, 2013

(65) Prior Publication Data
US 2014/0370923 A1 Dec. 18, 2014

(30) Foreign Application Priority Data
Feb. 1, 2012 (CN) .......................... 2012 1 0022544

(51) Int. Cl.
*H04W 4/14* (2009.01)
(52) U.S. Cl.
CPC ...................................... *H04W 4/14* (2013.01)
(58) Field of Classification Search
CPC ........................................................ H04W 4/14
USPC ................................................ 455/466, 574
See application file for complete search history.

(56) References Cited

U.S. PATENT DOCUMENTS

2007/0223428 A1 9/2007 Patterson et al.
2011/0165898 A1* 7/2011 Drevon et al. ............... 455/466
(Continued)

FOREIGN PATENT DOCUMENTS

CN 185283 A 10/2006
CN 102271312 A 12/2011
(Continued)

OTHER PUBLICATIONS

Extended European Search Report from European Patent Application No. 12867323.3-1870, dated Jun. 25, 2015.
International Search Report (Form PCT/ISA/210) for PCT/CN2012/074625 mailed Nov. 8, 2012.

*Primary Examiner* — Sharad Rampuria
(74) *Attorney, Agent, or Firm* — Koppel, Patrick, Heybl & Philpott

(57) ABSTRACT

The disclosure provides a method and system for sending a short message. The method includes: an SMS-SC sending a short message to an SMS-GMSC, and after the SMS-GMSC sends the short message to an MME, the MME sending a failure report to the SMS-GMSC when the MME detects that a terminal is unreachable (S202); the SMS-GMSC receiving the sent failure report and sending a short-message sending status message to an HSS, and the HSS setting waiting data according to the short-message sending status message (S204); upon detecting that the terminal switches from unreachable to reachable, the MME notifying the HSS that the terminal is reachable (S206); upon learning that the terminal is reachable, the HSS sending, according to the waiting data, a warning message to notify the SMS-SC that the terminal is reachable, and upon learning that the terminal is reachable again, the SMS-SC sending the short message again (S208). By means of the solution, a short message service can also be received in an area covered only by a packet switched network.

10 Claims, 2 Drawing Sheets

(56) References Cited

U.S. PATENT DOCUMENTS

2014/0016614 A1* 1/2014 Velev .................... H04W 4/005
                                                    370/331
2014/0089442 A1* 3/2014 Kim ...................... H04W 76/02
                                                    709/206

FOREIGN PATENT DOCUMENTS

| EP | 2136513 | 12/2009 |
| SN | 101119523 A | 2/2008 |
| WO | WO 2005002260 A1 | 1/2005 |
| WO | WO 2007053959 | 5/2007 |

* cited by examiner

METHOD AND SYSTEM FOR SENDING SHORT MESSAGE

TECHNICAL FIELD

The disclosure relates to the field of mobile communications, and particularly, to a method and system for sending a short message.

BACKGROUND

In the related art, an evolved packet system (EPS in short) network does not provide a circuit switching service, therefore a mobile management entity (MME in short) of the EPS network cannot support the sending of normal short messages. Normally, the EPS network provides data services such as network access downloading and uploading, while a circuit switching network provides services such as voice communication and short message. The EPS network can provide a user with a data service with a higher peak rate, therefore, users who use the data services more normally register in the EPS network. However, while enjoying the high speed data service, these users also need to receive a short message service, and in order to meet this requirement, the user registered in the EPS network may need to also register to the circuit switching network which can provide a short message service. As shown in FIG. 1, the sending process of a short message is as follows: a short message is sent from a Short Messaging Service-Service Centre (SMS-SC in short) to a Short Messaging Service-Gateway Mobile Switching Centre (SMS-GMSC in short) used for sending a short message, and the SMS-GMSC queries service node information about a terminal, that is, the address of the mobile switching centre (MSC in short) and the address of the mobile management entity (MME in short), to a home subscriber server (HSS in short), and sends the short message after obtaining the addresses, and then the mobile switching centre sends the short message to the MME, and finally, the MME sends the short message to the terminal.

Hereinafter, the network elements involved in the solution for sending a short message will be introduced simply as follows:

SMS-SC: generating content of a short message, and encapsulating same into a short message data packet according to a short message protocol.

SMS-GMSC: receiving the short message data packet sent by the SMS-SC; capable of reading the parameters in the short message data packet and checking the parameters; and querying routing information about the terminal to the HSS (here, the routing information refers to the identities of the MSC and the MME via which the short message is sent);

HSS: storing subscription information about each subscribed subscriber and service node information (such as the identity of the service node (MSC or MME) which provides service to the terminal);

MSC: a core network entity which provides services (the services include control signalling sending, short message sending, and mobility management) in the circuit switching network to the terminal;

MME: a core network entity which provides services (the services include control signalling sending, short message sending, and mobility management) in the packet switched network to the terminal;

In the above short message sending mechanisms, the terminal can receive a short message service only when the terminal is able to register in both the EPS network and the circuit switching network. This requires to deploy a circuit switching network while deploying an EPS network. However, within an area where a new network is deployed, to deploy a packet switched network and a circuit switching network simultaneously will increase the operation cost of a telecommunication operator, therefore, in order to reduce the operation cost, the operator does not deploy a co-coverage circuit switching network when deploying a new EPS network, and therefore, the user will not be able to receive a short message service in this scenario.

Aiming at the problem in the related art, no effective solution has been proposed yet.

SUMMARY

Aiming at the problem in relevant art that a short message service cannot be realized in a scenario where only the packet switched network is deployed, the disclosure provides a method and system for sending a short message so as to at least solve the above problem.

According to one aspect of the disclosure, a method for sending a short message is provided, including: a short messaging service-service centre (SMS-SC) sending a short message to a short messaging service-gateway mobile switching centre (SMS-GMSC), and after the SMS-GMSC sends the short message to a mobile management entity (MME), the MME sending a failure report to the SMS-GMSC when the MME detects that a terminal is unreachable; the SMS-GMSC receiving the sent failure report and sending a short-message sending status message to a home subscriber server, and the home subscriber server setting waiting data according to the short-message sending status message; upon detecting that the terminal switches from unreachable to reachable, the MME notifying the home subscriber server that the terminal is reachable; upon learning that the terminal is reachable, the home subscriber server sending, according to the waiting data, a warning message to notify the SMS-SC that the terminal is reachable, and upon learning that the terminal is reachable again, the SMS-SC sending the short message again.

The terminal is determined to be unreachable when the terminal is in one of the following statues: the terminal failing to respond to paging of the MME within a preset time; and a status of the terminal being a de-attachment status.

The short-message sending status message includes: an international mobile subscriber identity (IMSI) of the terminal and an identity of the SMS-SC; or an external identity of the terminal and an identity of the SMS-SC; or an IMSI of the terminal, an identity of the SMS-SC and a reason for failure sending; or an external identity of the terminal, an identity of the SMS-SC and a reason for failure sending.

The waiting data includes: an IMSI or an external identity of the terminal, an identity of the SMS-SC and a first waiting indication, wherein the first waiting indication is used for indicating that the terminal is unreachable in a packet switched network.

The waiting data further includes: a second waiting indication for indicating a reason why the terminal is unreachable in an evolved packet switched network.

The warning message includes: an IMSI or an external identity of the terminal.

The terminal is determined to switch from unreachable to reachable when the terminal is in one of the following statuses: the MME receiving a paging response from the terminal; the terminal being attached to a network.

When the terminal is unreachable, the MME sets a first waiting indication locally.

The method further includes: when it is detected for the first time that the terminal is reachable, the MME directly sending the short message to the terminal.

According to one aspect of the disclosure, a system for sending a short message is provided, including: a short messaging service-service centre (SMS-SC), a short messaging service-gateway mobile switching centre (SMS-GMSC) for sending a short message, a mobile management entity (MME) and a home subscriber server, wherein the MME includes: a detection module configured to detect whether a terminal is reachable after the SMS-SC sends a short message to the SMS-GMSC and the SMS-GMSC sends the short message to the MME; a first sending module configured to send a failure report to the SMS-GMSC when the detection module detects that the terminal is unreachable; a first notification module configured to send a warning message to notify the home subscriber server that the terminal is reachable when the detection module detects that the terminal switches from unreachable to reachable; the SMS-GMSC includes: a first receiving module configured to receive the failure report sent from the MME; a second sending module configured to send a short-message sending status message to the home subscriber server, wherein the home subscriber server sets waiting data according to the short-message sending status message; the home subscriber server includes: a second receiving module configured to receive the short-message sending status message from the SMS-GMSC; a second notification module configured to, upon learning that the terminal is reachable, according to the waiting data, notify the SMS-SC that the terminal is reachable, wherein upon learning that the terminal is reachable again, the SMS-SC sends the short message again.

The first sending module is further configured to directly send the short message to the terminal when detecting for the first time that the terminal is reachable.

By means of the disclosure, a short messaging service-service centre (SMS-SC) sends a short message to an SMS-GMSC, the SMS-GMSC sends the short message to an MME, and the SMS-SC is indicated to send the short message again by detecting whether the terminal is reachable, thereby solving the problem in relevant art that a short message service cannot be realized in a scenario where only the packet switched network is deployed, so that a short message service can also be received in an area only having packet switched network coverage.

DESCRIPTION OF THE ACCOMPANYING DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the accompanying drawings and embodiments in detail. Note that, the embodiments of the disclosure and the features of the embodiments may be combined with each other if there is no conflict.

Figure 1:
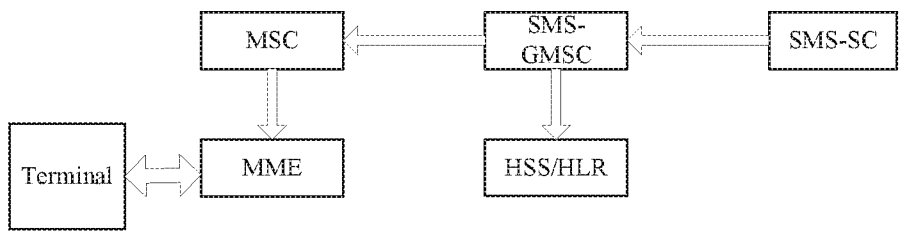
FIG. 1 is a schematic diagram showing the sending process of a short message according to relevant art.
Figure 2:
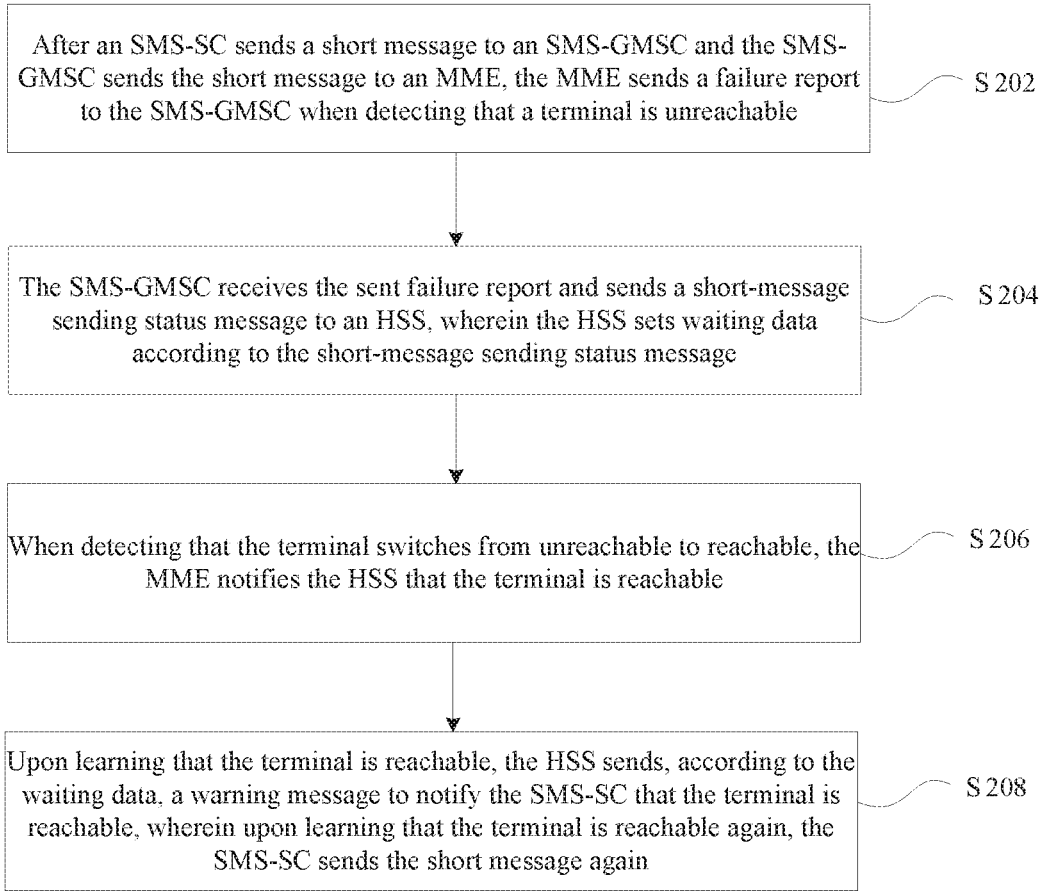
FIG. 2 is a flowchart of a method for sending a short message according to an embodiment of the disclosure.

FIG. 2 is a flowchart of a method for sending a short message according to an embodiment of the disclosure. As shown in FIG. 2, the method includes:

step S202, after an SMS-SC sends a short message to an SMS-GMSC and the SMS-GMSC sends the short message to an MME, the MME sends a failure report to the SMS-GMSC when detecting that a terminal is unreachable;

step S204, the SMS-GMSC receives the sent failure report and sends a short-message sending status message to an HSS, wherein the HSS sets waiting data according to the short-message sending status message;

step S206, when detecting that the terminal switches from unreachable to reachable, the MME notifies the HSS that the terminal is reachable;

step S208, upon learning that the terminal is reachable, the HSS sends, according to the waiting data, a warning message to notify the SMS-SC that the terminal is reachable, wherein upon learning that the terminal is reachable again, the SMS-SC sends the short message again.

By virtue of the above processing procedure, a short message can also be sent to the MME using the MME and the SMS-GMSC even in the situation where a circuit switching network is not deployed, so that the MME sends the short message to the terminal, especially when the terminal is unreachable, the SMS-SC can also be indicated to send the above short message again, therefore, the problem that a short message service cannot be realized if there is only a packet switched network can be solved, and a short message service can also be received within an area only having packet switched network coverage.

During specific application, the above step S204 that, when the terminal is detected to be unreachable, the MME sends a notification message to the HSS via the SMS-GMSC is realized with the following processing procedure.

1. When the terminal is unreachable, the MME sets a first waiting indication locally and sends a short-message sending failure report to the SMS-GMSC. The terminal is determined to be unreachable when the terminal is in the following statuses: 1) the MME pages the terminal, but does not receive a paging response from the terminal, that is, the terminal fails to respond to paging of the MME within a preset time; 2) the terminal is de-attached; the above first waiting indication is UNRE (for indicating that the terminal is unreachable in the EPS network): this waiting indication is a Boolean variable, the value thereof is set to be "TRUE" here. The meaning of the above de-attachment is as follows: the terminal may actively initiate a de-attachment request to the MME, the MME deletes the bearer allocated to the terminal by the network, and sets the status of the terminal to be a de-attachment status; or when the MME does not receive any signalling or data of the terminal within a preset time, the MME deems that the terminal is de-attached from the network and sets the status of the terminal as a de-attachment status.

2. The SMS-GMSC sends a short-message sending status report (message) to the HSS.

The short-message sending status message includes the following information: the international mobile subscriber identity (IMSI in short) of the terminal and the identity of the SMS-SC; or the external identity of the terminal and the identity of the SMS-SC; or the IMSI of the terminal, the identity of the SMS-SC and the reason for failure sending; or the external identity of the terminal, the identity of the SMS-SC and the reason for failure sending.

The above IMSI is the identity used inside a mobile communication network; the remaining is the external identity of the terminal, that is, the identity used outside the mobile communication network. The meaning of the external identity is as follows: the external identity of the terminal is a global unique identity, which is mainly used for identifying the terminal on an application server outside the mobile communication network, and the constituent part thereof may contain the identity of the operator and random serial number. The external identity of the terminal corresponds to the unique IMSI of the terminal inside the mobile communication network. The terminal may have a plurality of external identities, for example, the terminal supports a plurality of application types, wherein different applications are allocated with different external identities on the application server, which also means that one IMSI may correspond to a plurality of external identities.

3. The HSS saves the identity of the terminal, the identity of the SMS-SC and the waiting indication as waiting data.

The above waiting indication has two setting methods: 1) one waiting indication UNRE (equivalent to the first waiting indication, for indicating that the terminal is unreachable in the EPS network): this identity is a Boolean variable, the value thereof is set as "TRUE" here. 2) Two waiting indications UNRE and UNRR (equivalent to the second waiting indication, for indicating the reason why the terminal is unreachable): UNRE is set to be "TRUE", and UNRR is set to be "no response to paging" or "terminal de-attachment".

During specific application, the above processing procedure in step S206 may be particularly embodied as the following processing procedure: 1. when the terminal is reachable again (for example, the terminal responds to the paging of the MME), the MME sends a message to notify the HSS that the terminal is reachable; 2. the HSS queries the SMS-SC corresponding to the terminal according to the waiting data and sends a message to notify the SMS-SC that the terminal is reachable; 3, the SMS-SC resends a short message, and the resending procedure includes: (1), the SMS-SC sends a short message to the SMS-GMSC; (2), the SMS-GMSC sends a routing information query message to the HSS; (3). the HSS sends routing information to the SMS-GMSC, the routing information containing the identity of the MME which provides services to the terminal; (4), the SMS-GMSC sends the short message to the MME according to the routing information; (5), the MME sends the short message to the terminal.

In this embodiment, the above waiting data may include: the IMSI or the external identity of the terminal, the identity of the SMS-SC and a first waiting indication, wherein the first waiting indication is used for indicating that the terminal is unreachable in an evolved packet switched network. However, the waiting data is not limited to this, as long as this waiting data can enable the above HSS to notify the SMS-SC of the status that the terminal is reachable again.

There are many methods to acquire the above waiting data, for example, the waiting data may be preset in the HSS, may also be set according to the information carried in the above notification message received by the HSS, and may also be set by the MME.

As mentioned in the above, the above waiting data may include the first waiting indication, however, sometimes, in order to enable the query party to learn the reason why the terminal is unreachable, the above waiting data may further include a second waiting indication, which second waiting indication is used for indicating the reason why the terminal is unreachable.

In step S208, the above warning message may include but is not limited to: the IMSI or the external identity of the terminal The terminal is determined to switch from unreachable to reachable when the terminal is in one of the following statuses: the MME receiving a paging response from the terminal; and the terminal being attached to a network. When terminal is attached to the network, the terminal will send an attachment request signalling to the MME, and the MME deems that the terminal is reachable after receiving the request signalling of the terminal.

It can be seen from the above embodiments that the above processing procedure is mainly a processing solution for the case when the terminal is unreachable, however, when it is detected for the first time that the terminal is reachable, the MME may directly send a short message to the terminal. With this processing procedure, a short message can be sent to a terminal in the case that there is only a packet switched network. During specific application, the processing procedure in this situation may include: 1. the SMS-SC sends a short message to the SMS-GMSC; 2. the SMS-GMSC sends a routing information query message to the HSS; 3. the HSS sends routing information to the SMS-GMSC, the routing information containing the identity of the MME which provides services to the terminal; 4. the SMS-GMSC sends the short message to the MME according to the routing information; 5. the MME sends the short message to the terminal.

Figure 3:
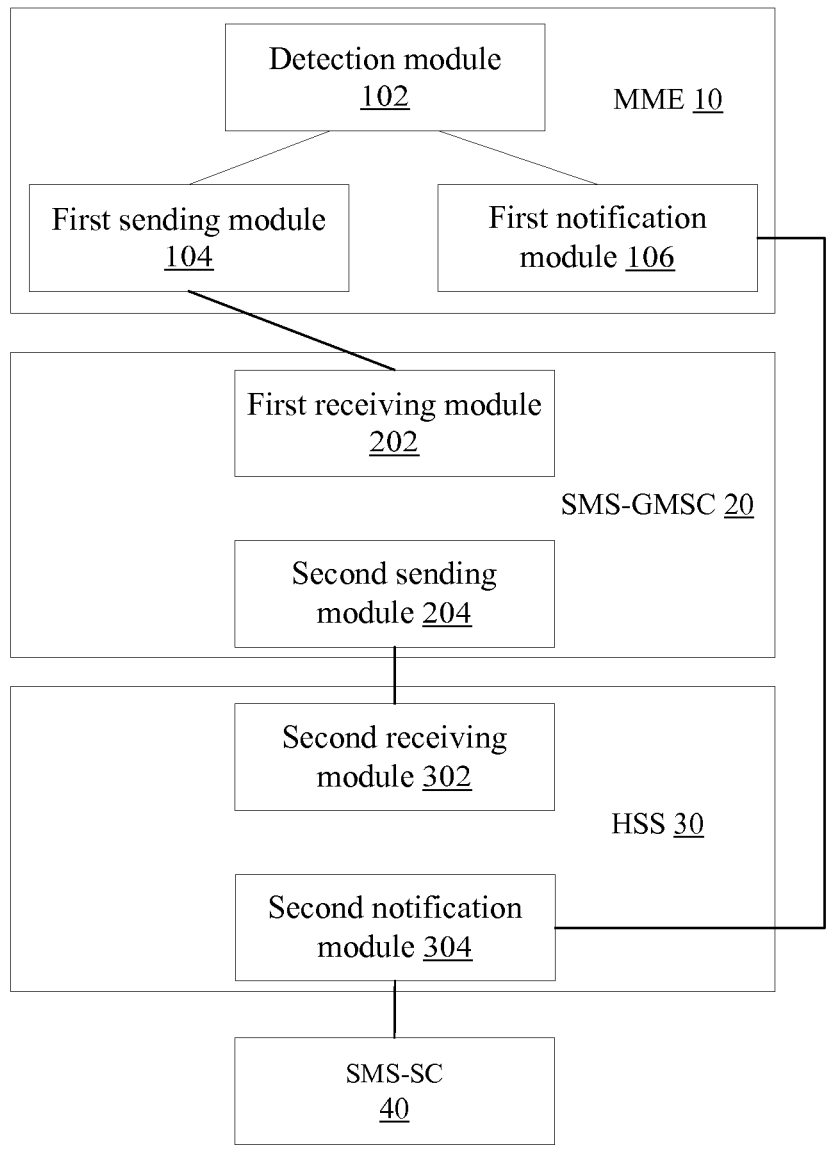
FIG. 3 is a structural block diagram of a system for sending a short message according to an embodiment of the disclosure.

In this embodiment, a system for sending a short message is also provided, for implementing the above embodiments and preferred implementations, and those which have been described will not be described any more, hereinafter, the modules involved in this apparatus will be described. As used hereinafter, the term "module" can realize a combination of software and/or hardware with preset functions. Although the apparatus described in the following embodiments is realized with software more preferably, hardware or a combination of software and hardware is also possible and conceivable. FIG. 3 is a structural block diagram of a system for sending a short message according to an embodiment of the disclosure. As shown in FIG. 3, the system includes: an MME 10, an SMS-GMSC 20, an HSS 30 and an SMS-SC 40, wherein the MME 10 includes: a detection module 102 connected to a first sending module 104 and a first notification module 106 and configured to detect whether a terminal is reachable after the SMS-SC 40 sends a short message to the SMS-GMSC 20 and the SMS-GMSC 20 sends the short message to the MME 10;

the first sending module 104 is configured to send a failure report to the SMS-GMSC 20 when the detection module detects that the terminal is unreachable;

the first notification module 106 is configured to send a warning message to notify the HSS that the terminal is reachable when the detection module detects that the terminal switches from unreachable to reachable;

the SMS-GMSC 20 includes: a first receiving module 202 connected to the first sending module 104 and configured to receive the failure report sent from the MME 10; a second sending module 204 connected to the second receiving module 302 and configured to send a short-message sending status message to the HSS 30, wherein the HSS 30 sets waiting data according to the short-message sending status message;

the HSS 30 includes: a second receiving module 302 configured to receive the short-message sending status message from the SMS-GMSC 20; a second notification module 304 connected to the first notification module 106 and configured to, upon learning that the terminal is reachable, according to the waiting data, notify the SMS-SC 40 that the terminal is reachable, wherein upon learning that the terminal is reachable again, the SMS-SC 40 sends the short message again.

For better understanding the above-mentioned embodiment, detailed description will be done in conjunction with preferred embodiments hereinafter.

Embodiment 1

In this embodiment, the HSS uses the IMSI when saving the waiting data, and the waiting data is UNRE and UNRR, and the particular processing procedure is as follows.

1. The SMS-SC constructs a short message and sends the short message to the SMS-GMSC. The short message contains the identity IMSI of the terminal, the identity of the SMS-SC and the text information or multimedia data to be sent by the SMS-SC.

2. After receiving the short message, the SMS-GMSC reads the IMSI in the short message, and sends the identity of the terminal to the HSS by containing the identity of the terminal in a routing information request message.

3. After receiving the routing information request message, the HSS reads the IMSI in the request message, looks up the identity of the MME corresponding to this IMSI in a local database using this IMSI, and then sends the IMSI and the identity of the corresponding MME to the SMS-GMSC in a routing information feedback message.

4. After receiving the routing information feedback message, the SMS-GMSC reads the identity of the MME and sends the short message received from the SMS-SC to the MME.

5. The MME reads the IMSI in the short message, looks up the local database according to the IMSI, obtains the status of the terminal, and if the terminal is in an idle status, the MME sends a paging message to the terminal, and after receiving the paging message, the terminal sends a service request signalling to the MME to request to establish an NAS (non-access stratum) connection with the MME. After the NAS connection is established, the MME encapsulates the short message received from the SMS-GMSC into a NAS signalling Downlink NAS transport, that is, the short message is used as an information cell of this NAS signalling to be sent to the terminal; and if the terminal is in a connection status, then the MME directly encapsulates the short message into the NAS signalling Downlink NAS transport and sends same to the terminal.

6. If the terminal is unreachable, that is, the MME learns that this terminal is in an idle status, and deems that the terminal cannot respond to the paging if it does not receive the service request signalling of the terminal within 5 minutes after sending a paging message; or when the MME learns that this terminal is in a de-attachment status, then the MME sets a waiting indication UNRE (UE Not Reachable in EPS) locally, sets the value of this identity to be "TRUE", and sends a service request sending report to the SMS-GMSC, the report containing the following information: A, short message sending status: set to be failed; B, reason: set to be the case that the terminal does not respond to the paging (or the terminal does not attach, and in this embodiment, taking the case that the terminal does not respond to the paging as an example); and C, terminal identity: IMSI.

7. After receiving the short message sending report sent by the MME, the SMS-GMSC reads the content therein, and if the short message sending status is failure, then a short-message sending status report will be sent to the HSS, the report containing the following information: A, short message sending status: set to be failure; B, reason: set to be the case that the terminal does not respond to the paging; C, SMS-SC identity: set to be receiving the identity of the SMS-SC set in this short message; and D, terminal identity: IMSI.

8. The HSS maintains a local database locally, which is dedicated to saving relevant information after the sending of the short message is failed, containing the identity of the terminal, the waiting indication and the identity of the short message source SMS-SC. After receiving the short-message sending status report sent from the SMS-GMSC, the HSS reads the content of the report, if the short message sending status is failure and the reason is that the terminal is unreachable, then the IMSI and the identity of the SMS-SC in the received report, and waiting indications UNRE and UNRR (UE Not Reachable Reason) added for this piece of waiting data are stored in the waiting data, wherein the UNRE is set to be "TRUE", and the UNRR is set to be "the terminal does not respond to the paging", and the IMSI is used as the index of the waiting data.

9. If the MME has set the waiting indication UNRE, the MME clears the local UNRE identity, after the terminal responds to the paging message sent by the MME and sends a service request signalling to the MME, and the MME sends to the HSS a notification signalling that the terminal is reachable, the signalling containing: A, terminal identity: IMSI; and B, terminal status: the terminal is reachable.

10. After receiving the notification signalling that the terminal is reachable, if the terminal status in the signalling is that the terminal is reachable, the HSS queries the waiting data according to the IMSI in the signalling, acquires the identity of the SMS-SC which takes this IMSI as an index, and sends a notification signalling to the SMS-GMSC, the signalling containing the identity IMSI of the terminal and the identity of the SMS-SC.

11. After receiving the notification signalling, the SMS-GMSC reads the identity of the SMS-SC in the signalling, and sends the notification signalling to the SMS-SC, the notification signalling containing the identity IMSI of the terminal.

12. After receiving the notification signalling, the SMS-SC queries the short message to be sent to this terminal according to the IMSI in the notification signalling and sends the short message of this terminal to the SMS-GMSC, and the SMS-GMSC sends the short message to the MME, and then the MME sends the short message to the terminal.

13. After receiving the short message, the terminal sends acknowledgement feedback information to the MME, the MME sends a short message sending report to the SMS-GMSC, the report containing: A, short message sending status: sending succeeded; B, reason: null; C, terminal identity: IMSI.

14. After receiving the short message sending report, if the short message sending status is success, the SMS-GMSC sends the short message sending report to the SMS-SC, the reporting indicating the identity of the terminal and short message sending success and at the same time sends the short-message sending status report to the HSS, the report indicating the identity of the terminal and short message sending success.

15. After receiving the short-message sending status report sent from the SMS-GMSC, the HSS reads the message therein, if the report indicates short message sending success, queries waiting data according to the IMSI in the report and deletes the waiting data corresponding to this IMSI.

Embodiment 2

In this embodiment, the HSS uses the IMSI when saving the waiting data, and the waiting data is UNRE, and the particular processing solution of this embodiment is as follows.

1. The SMS-SC constructs a short message and sends the short message to the SMS-GMSC. The short message contains the identity IMSI of the terminal, the identity of the SMS-SC and the text information or multimedia data to be sent by the SMS-SC.

2. The SMS-GMSC receives the short message, reads the IMSI in the short message, and sends the identity of the terminal to the HSS by containing the identity of the terminal in a routing information request message.

3. After receiving the routing information request message, the HSS reads the IMSI in the request message, looks up the identity of the MME corresponding to this IMSI in a local database using this IMSI, and then sends the IMSI and the identity of the corresponding MME to the SMS-GMSC in a routing information feedback message.

4. After receiving the routing information feedback message, the SMS-GMSC reads the identity of the MME and sends the short message received from the SMS-SC to the MME.

5. The MME reads the IMSI in the short message, looks up the local database according to the IMSI, obtains the status of the terminal, and if the terminal is in an idle status, the MME sends a paging message to the terminal, and after receiving the paging message, the terminal sends a service request signalling to the MME to request to establish an NAS (non-access stratum) connection with the MME. After the NAS connection is established, the MME encapsulates the short message received from the SMS-GMSC into an NAS signalling Downlink NAS transport, that is, the short message is used as an information cell of this NAS signalling to be sent to the terminal; and if the terminal is in a connection status, then the MME directly encapsulates the short message into the NAS signalling Downlink NAS transport and sends same to the terminal.

6. If the terminal is unreachable, that is, the MME learns that this terminal is in an idle status, and deems that the terminal cannot respond to the paging if it does not receive the service request signalling of the terminal within 5 minutes after sending a paging message; or when the MME learns that this terminal is in a de-attachment status, then the MME sets a waiting indication UNRE (UE Not Reachable in EPS) locally, sets the value of this identity to be "TRUE", and sends a service request sending report to the SMS-GMSC, the report containing the following information: A, short message sending status: set to be failed; B, reason: the terminal is unreachable; and C, terminal identity: IMSI.

7. After receiving the short message sending report sent by the MME, the SMS-GMSC reads the content therein, and if the short message sending status is failure, then a short-message sending status report will be sent to the HSS, the report containing the following information: A, short message sending status: set to be failure; B, reason: the terminal is unreachable; C, SMS-SC identity: set to be receiving the identity of the SMS-SC set in this short message; and D, terminal identity: IMSI.

8. The HSS maintains a local database locally, which is dedicated to saving relevant information after the sending of the short message is failed, containing the identity of the terminal, the waiting indication and the identity of the short message source SMS-SC. After receiving the short-message sending status report sent from the SMS-GMSC, the HSS reads the content of the report, if the short message sending status is failure and the reason is that the terminal is unreachable, then the IMSI and the identity of the SMS-SC in the received report, and a waiting indication UNRE added for this piece of waiting data are stored in the waiting data, wherein the UNRE is set to be "TRUE" and saved in the waiting data, and the IMSI is used as the index of the waiting data.

9. If the MME has set the waiting indication UNRE, the MME clears the local UNRE identity, after the terminal responds to the paging message sent by the MME and sends a service request signalling to the MME, and the MME sends to the HSS a notification signalling that the terminal is reachable, the signalling containing: A, terminal identity: IMSI; and B. terminal status: the terminal is reachable.

10. After receiving the notification signalling that the terminal is reachable, if the terminal status in the signalling is that the terminal is reachable, the HSS queries the waiting data according to the IMSI in the signalling, acquires the identity of the SMS-SC which takes this IMSI as an index, and sends a notification signalling to the SMS-GMSC, the signalling containing the identity IMSI of the terminal and the identity of the SMS-SC.

11. After receiving the notification signalling, the SMS-GMSC reads the identity of the SMS-SC in the signalling, and sends the notification signalling to the SMS-SC, the notification signalling containing the identity IMSI of the terminal.

12. After receiving the notification signalling, the SMS-SC queries the short message to be sent to this terminal according to the IMSI in the notification signalling and sends the short message of this terminal to the SMS-GMSC, and the SMS-GMSC sends the short message to the MME, and then the MME sends the short message to the terminal.

13. After receiving the short message, the terminal sends acknowledgement feedback information to the MME, the MME sends a short message sending report to the SMS-GMSC, the report containing: A, short message sending status: sending succeeded; B, reason: null; C, terminal identity: IMSI.

14. After receiving the short message sending report, if the short message sending status is success, the SMS-GMSC sends the short message sending report to the SMS-SC, the reporting indicating the identity of the terminal and short message sending success and at the same time sends the short-message sending status report to the HSS, the report indicating the identity of the terminal and short message sending success.

15. After receiving the short-message sending status report sent from the SMS-GMSC, the HSS reads the message therein, if the report indicates short message sending success, queries waiting data according to the IMSI in the report and deletes the waiting data corresponding to this IMSI.

Embodiment 3

In this embodiment, the external identity index of the terminal is used in the waiting data. This embodiment can employ the following processing procedure to realize the sending of a short message.

1. The SMS-SC constructs a short message and sends the short message to the SMS-GMSC. The short message contains the external identity of the terminal, the identity of the SMS-SC and the text information or multimedia data to be sent by the SMS-SC.

2. After receiving the short message, the SMS-GMSC reads the external identity of the terminal in the short message, and sends the external identity of the terminal to the HSS by containing the external identity of the terminal in a routing information request message.

3. After receiving the routing information request message, the HSS reads the external identity of the terminal in the request message, queries an internal and external identity mapping table saved by the HSS using this external identity, looks up the identity of the MME corresponding to this IMSI in a local database using this IMSI, and then sends the IMSI and the identity of the corresponding MME to the SMS-GMSC in a routing information feedback message.

4. After receiving the routing information feedback message, the SMS-GMSC reads the identity of the MME and sends the short message received from the SMS-SC to the MME.

5. The MME reads the IMSI in the short message, looks up the local database according to the IMSI, obtains the status of the terminal, and if the terminal is in an idle status, the MME sends a paging message to the terminal, and after receiving the paging message, the terminal sends a service request signalling to the MME to request to establish an NAS (non-access stratum) connection with the MME. After the NAS connection is established, the MME encapsulates the short message received from the SMS-GMSC into an NAS signalling Downlink NAS transport, that is, the short message is used as an information cell of this NAS signalling to be sent to the terminal; and if the terminal is in a connection status, then the MME directly encapsulates the short message into the NAS signalling Downlink NAS transport and sends same to the terminal.

6. If the terminal is unreachable, that is, the MME learns that this terminal is in an idle status, and deems that the terminal cannot respond to the paging if it does not receive the service request signalling of the terminal within 5 minutes after sending a paging message; or when the MME learns that this terminal is in a de-attachment status, then the MME sets a waiting indication UNRE (UE Not Reachable in EPS) locally, sets the value of this identity to be "TRUE", and sends a service request sending report to the SMS-GMSC, the report containing the following information: A, short message sending status: set to be failed; B, reason: the terminal is unreachable; and C, terminal identity: IMSI.

7. After receiving the short message sending report sent by the MME, the SMS-GMSC reads the content therein, and if the short message sending status is failure, then a short-message sending status report will be sent to the HSS, the report containing the following information: A, short message sending status: set to be failure; B, reason: the terminal is unreachable; C, SMS-SC identity: set to be receiving the identity of the SMS-SC set in this short message; and D, terminal identity: the external identity of the terminal 8. The HSS maintains a local database locally, which is dedicated to saving relevant information after the sending of the short message is failed, containing the identity of the terminal, the waiting indication and the identity of the short message source SMS-SC. After receiving the short-message sending status report sent from the SMS-GMSC, the HSS reads the content of the report, if the short message sending status is failure and the reason is that the terminal is unreachable, then the IMSI and the identity of the SMS-SC in the received report, and a waiting indication UNRE added for this piece of waiting data are stored in the waiting data, wherein the UNRE is set to be "TRUE" and saved in the waiting data, and the external identity of the terminal is used as the index of the waiting data.

9. If the MME has set the waiting indication UNRE, after the terminal responds to the paging message sent by the MME and sends a service request signalling to the MME, the MME clears the local UNRE identity and sends to the HSS a notification signalling that the terminal is reachable, the signalling containing: A. terminal identity: IMSI; and B. terminal status: the terminal is reachable.

10. After receiving the notification signalling that the terminal is reachable, if the terminal status in the signalling is that the terminal is reachable, the HSS queries an internal and external identity mapping table according to the IMSI in the signalling, acquires the external identity of the terminal, and then queries a waiting database, acquires the identity of the corresponding SMS-SC, and sends a notification signalling to the SMS-GMSC, the signalling containing the external identity of the terminal and the identity of the SMS-SC.

11. After receiving the notification signalling, the SMS-GMSC reads the identity of the SMS-SC in the signalling, sends the notification signalling to the SMS-SC, the notification signalling containing the external identity of the terminal.

12. After receiving the notification signalling, the SMS-SC queries the short message to be sent to this terminal according to the external identity in the notification signalling and sends the short message of this terminal to the SMS-GMSC, and the SMS-GMSC sends the short message to the MME, and then the MME sends the short message to the terminal.

13. After receiving the short message, the terminal sends acknowledgement feedback information to the MME, the MME sends a short message sending report to the SMS-GMSC, the report containing: A, short message sending status: sending succeeded; B, reason: null; C, terminal identity: IMSI.

14. After receiving the short message sending report, the SMS-GMSC sends a short-message sending status report to the HSS, the report containing the external identity of the terminal and indicating short message sending success.

15. After receiving the short-message sending status report sent from the SMS-GMSC, the HSS reads the message therein, if the report indicates short message sending success, queries an internal and external identity mapping table, obtains the external identity of the terminal, queries the waiting data according to the external identity of the terminal and deletes the waiting data record corresponding to this IMSI and feeds back the external identity of the terminal to the SMS-GMSC.

16. After receiving the external identity of the terminal, the SMS-GMSC sends a short-message sending status report to the SMS-SC, the report containing the external identity of the terminal and indicating short message sending success.

In another embodiment, also provided is software, which software is used for performing the technical solution described in the above embodiments and preferred implementations.

In another embodiment, also provided is a storage medium, which storage medium stores the above software and includes but not limited to: optical disk, soft disk, hard disk, erasable storage and so on.

Obviously, those skilled in the art should know that each of the mentioned modules or steps of the disclosure may be realized by universal computing devices; the modules or steps may be focused on single computing device, or distributed on the network formed by multiple computing devices; selectively, they may be realized by the program codes which may be executed by the computing device; thereby, the modules or steps may be stored in the storage device and executed by the computing device; and under some circumstances, the shown or described steps may be executed in different orders, or may be independently manufactured as each integrated circuit module, or multiple modules or steps thereof may be manufactured to be single integrated circuit module, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection as defined in the appended claims of the disclosure.

What is claimed is:

1. A method for sending a short message, comprising:
a short messaging service-service centre (SMS-SC) sending a short message to a short messaging service-gateway mobile switching centre (SMS-GMSC), and after the SMS-GMSC sends the short message to a mobile management entity (MME), the MME sending a failure report to the SMS-GMSC when the MME detects that a terminal is unreachable;
the SMS-GMSC receiving the sent failure report and sending a short-message sending status message to a home subscriber server, and the home subscriber server setting waiting data according to the short-message sending status message;
upon detecting that the terminal switches from unreachable to reachable, the MME notifying the home subscriber server that the terminal is reachable;
upon learning that the terminal is reachable, the home subscriber server sending, according to the waiting data, a warning message to notify the SMS-SC that the terminal is reachable, and upon learning that the terminal is reachable again, the SMS-SC sending the short message again;
wherein the terminal is determined to be unreachable when the terminal is in one of the following statuses: the terminal failing to respond to paging of the MME within a preset time; and a status of the terminal being a de-attachment status;
wherein when the terminal is determined to be unreachable, the MME sets a first waiting indication locally, the first waiting indication being indicating that the terminal is unreachable in a Evolved Packet System (EPS) network.

2. The method according to claim 1, wherein the short-message sending status message comprises:
an international mobile subscriber identity (IMSI) of the terminal and an identity of the SMS-SC;
or an external identity of the terminal and an identity of the SMS-SC;
or an IMSI of the terminal, an identity of the SMS-SC and a reason for failure sending;
or an external identity of the terminal, an identity of the SMS-SC and a reason for failure sending.

3. The method according to claim 1, wherein the waiting data comprises:
an IMSI or an external identity of the terminal, an identity of the SMS-SC and a first waiting indication, wherein the first waiting indication is used for indicating that the terminal is unreachable in a packet switched network.

4. The method according to claim 3, wherein the waiting data further comprises: a second waiting indication for indicating a reason why the terminal is unreachable in an evolved packet switched network.

5. The method according to claim 1, wherein the warning message comprises: an IMSI or an external identity of the terminal.

6. The method according to claim 1, wherein the terminal is determined to switch from unreachable to reachable when the terminal is in one of the following statuses:
the MME receiving a paging response from the terminal;
the terminal being attached to a network.

7. The method according to claim 1, wherein when the terminal is unreachable, the MME sets a first waiting indication locally.

8. The method according to claim 1, further comprising:
when it is detected for the first time that the terminal is reachable, the MME directly sending the short message to the terminal.

9. A system for sending a short message, comprising: a short messaging service-service centre (SMS-SC), a short messaging service-gateway mobile switching centre (SMS-GMSC) for sending a short message, a mobile management entity (MME) and a home subscriber server, wherein the MME comprises a hardware processor configured to execute program modules stored on a memory, the program modules comprising:
a first sending module configured to send a failure report to the SMS-GMSC when the detection module detects that the terminal is unreachable, wherein the terminal is determined to be unreachable when the terminal is in one of the following statuses: the terminal failing to respond to paging of the MME within a preset time; and a status of the terminal being a de-attachment status; when the terminal is determined to be unreachable, the MME sets a first waiting indication locally, the first waiting indication being indicating that the terminal is unreachable in a Evolved Packet System (EPS) network;
a first notification module configured to send a warning message to notify the home subscriber server that the terminal is reachable when the detection module detects that the terminal switches from unreachable to reachable;
the SMS-GMSC comprises a hardware processor configured to execute program modules stored on a memory, the program modules comprising:
a first receiving module configured to receive the failure report sent from the MME;
a second sending module configured to send a short-message sending status message to the home subscriber server, wherein the home subscriber server sets waiting data according to the short-message sending status message;
the home subscriber server comprises a hardware processor configured to execute program modules stored on a memory, the program modules comprising:
a second receiving module configured to receive the short-message sending status message from the SMS-GMSC;
a second notification module configured to, upon learning that the terminal is reachable, according to the waiting data, notify the SMS-SC that the terminal is reachable, wherein upon learning that the terminal is reachable again, the SMS-SC sends the short message again.

10. The system according to claim 9, wherein the first sending module is further configured to directly send the short message to the terminal when detecting for the first time that the terminal is reachable.

\* \* \* \* \*